UNITED STATES PATENT OFFICE.

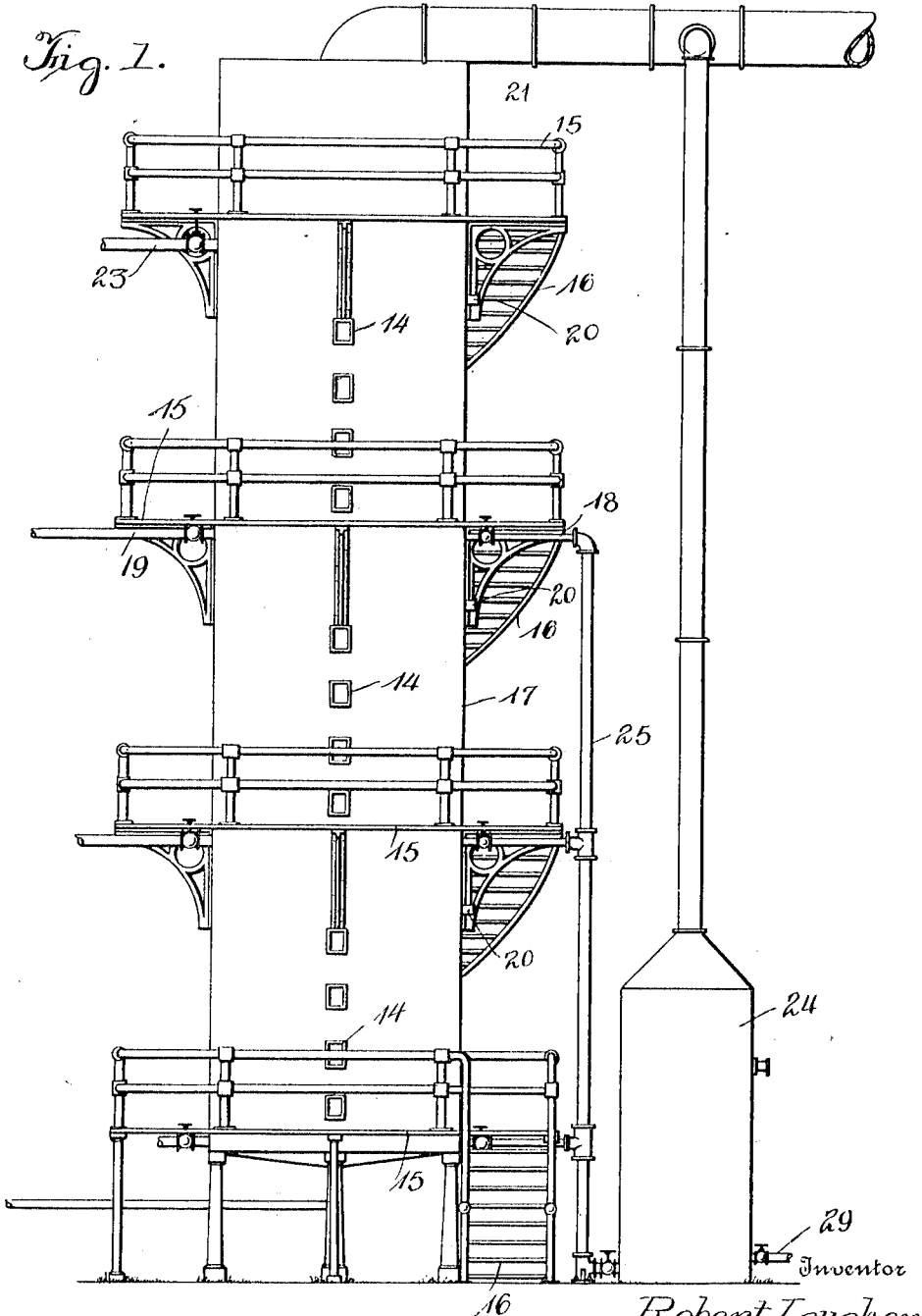

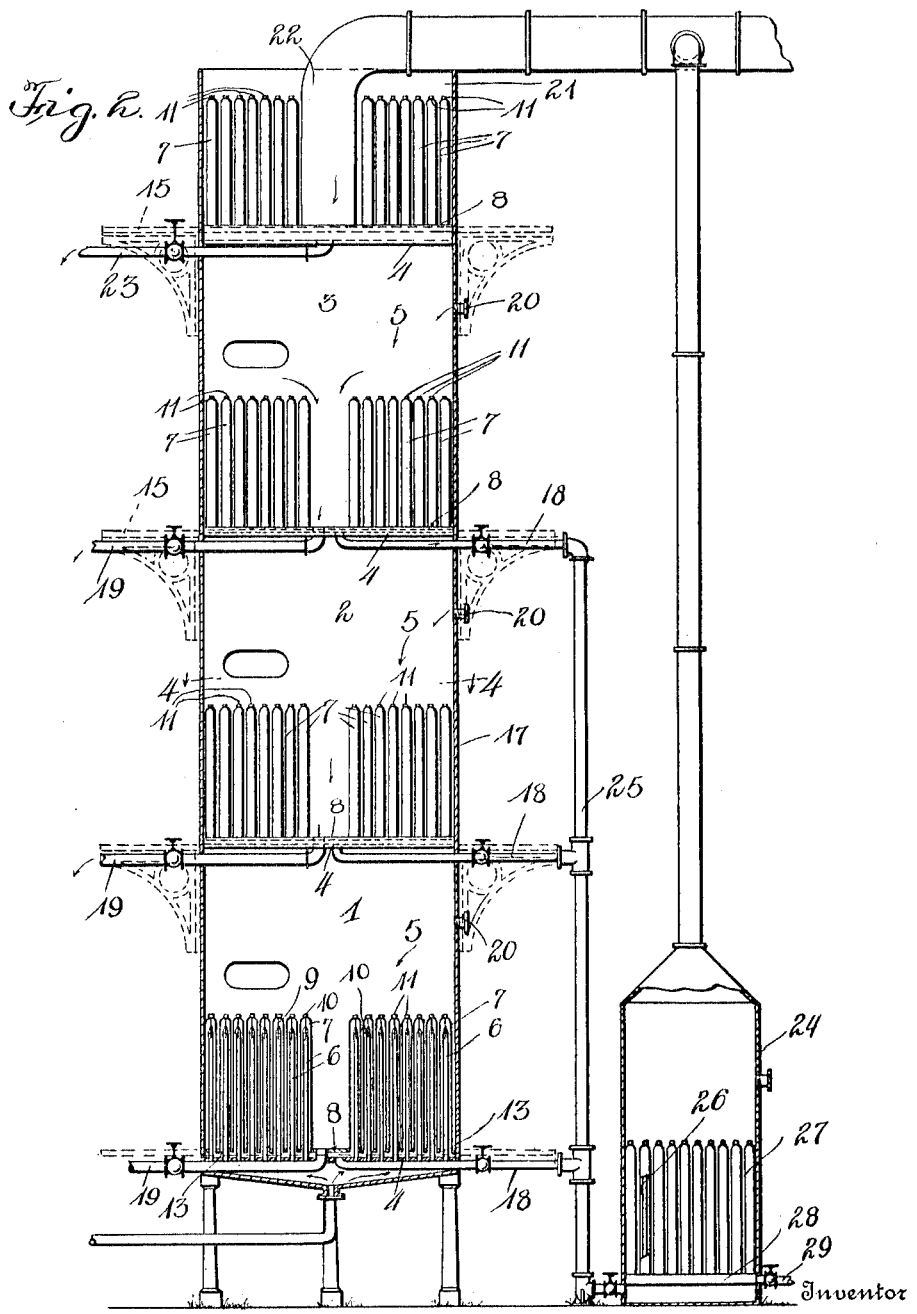

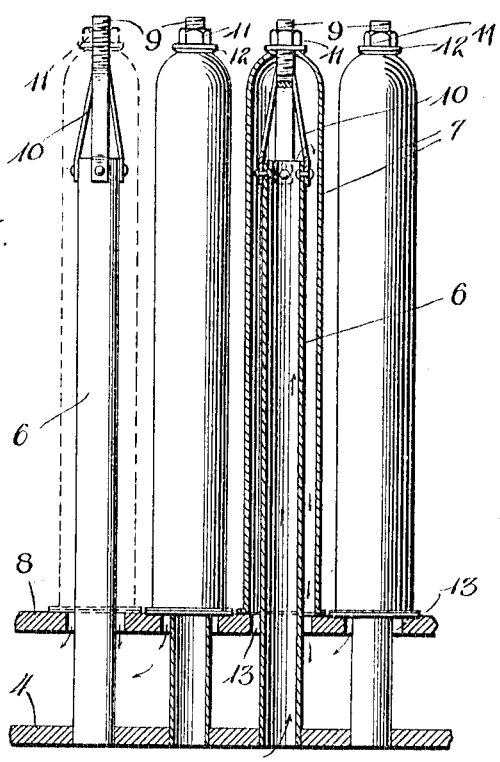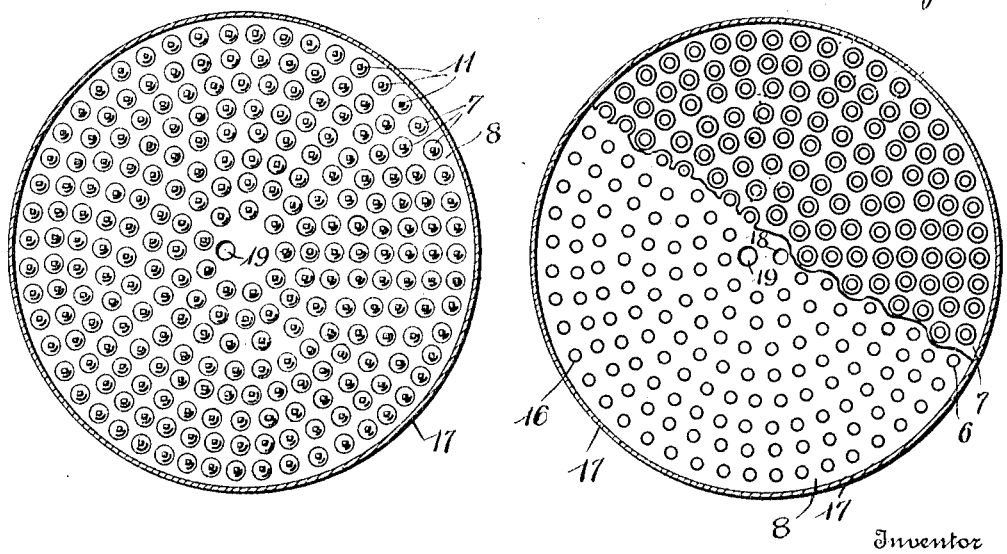

ROBERT LOUGHER, OF PAPAIKOU, TERRITORY OF HAWAII.

MULTIPLE-EFFECT EVAPORATING APPARATUS.

1,105,443. Specification of Letters Patent. Patented July 28, 1914.

Application filed June 28, 1912. Serial No. 706,536.

*To all whom it may concern:*

Be it known that I, ROBERT LOUGHER, a citizen of the United States, residing at Papaikou, Hawaii, have invented new and useful Improvements in Multiple - Effect Evaporating Apparatus, of which the following is a specification.

Apparatus utilized for concentrating liquids by evaporation have their efficiency reduced proportionately to the scale or other deposits accumulating on the surfaces of the tubes or other heating walls. In certain sections such apparatus rapidly deteriorates because of the rapid accumulation of scale and where surfaces are not readily accessible to admit of easy removal of the scale and other accumulations the efficiency of the apparatus is reduced to such an extent as to render the apparatus practically unprofitable. In sections where the solution contains a high percentage of alkali sulfate the scale accumulation is very rapid in growth and unless such scale be removed the loss in efficiency renders the apparatus unprofitable and has frequently resulted in discarding certain types of evaporators which otherwise are very effective and desirable.

The present invention provides an evaporator of the multiple effect embodying evaporating or heating tubes which are readily removable to admit of scale accumulations being dislodged or such scale coated tubes being quickly replaced by other evaporating tubes free from all scale.

The invention is further designed to provide a multiple effect apparatus in one body, thereby economizing in floor space; to reduce the quantity necessary to construct a multiple effect apparatus and to dispense with the use of saucers, domes, staging and external vapor pipes, to provide heating vapor conduits within the body of the apparatus, with the result of conserving heat and lastly to provide for the arresting of the entrained particles of liquor from the last evaporating section and heating cold juice or solution with vapor from the last effect.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view of a multiple effect evaporator comprising the invention. Fig. 2 is a sectional view of the apparatus. Fig. 3 is a detail view of a portion of one of the sections. Fig. 4 is a horizontal section on the line 4—4 of Fig. 2. Fig. 5 is a detail view of the two tube sheets, the upper sheet having a portion broken away.

Corresponding and like parts are referred to in the following description, and indicated in all the views of the drawings, by the same reference characters.

While the apparatus is particularly designed for the concentration of saccharin solution and juice it is to be understood that it may be utilized for evaporating liquids and solutions of any nature. The efficiency of such apparatus depends to a great extent on the circulation of the solutions or liquids and the contact of the heating vapor with the heating surface. The present invention aims to construct an apparatus in such a manner as to effectuate the most intimate contact of heating vapor and heating surface by introducing the heating vapor to the upper end of the tube or tubes which constitute the heating surface for purposes of evaporation, thereby causing the current of vapor to descend and to force the water of condensation before it downward into condensed water space from which it is drawn off by suitable means.

As shown in the accompanying drawings the apparatus is constructed in the form of a tower embodying superimposed sections, the first section having a suitable foundation and pan, each section constituting a unit of a multiple effect apparatus and each section having a condensed water space, heating or evaporating surface space and space for the liquid particles to separate from the vapor arising from the heating surface.

The drawings illustrate three sections 1, 2 and 3 arranged in the form of a tower to work as a multiple effect, the purpose being to obtain an efficient circulation of the heating vapor throughout the apparatus and to maintain the circulation in all its parts, with the view of attaining a maximum efficiency from the heating surface involved. This result is accomplished by providing each tube which is used as a heating surface with its full quota of heating vapor independently of the remaining tubes. This result is brought about by means of a tube sheet 4 arranged above each vapor space or chamber 5, with tubes 6 expanded at the lower end therein. The tubes 6 are open throughout their length and extend up and into tubes 7, which are employed as heating vapor conduits only. A tube sheet 8 is arranged a short distance above each tube sheet 4 and forms a support for the evaporating or heating tubes 7, which rest thereon simply to admit of the tubes 7 being easily and quickly removed for cleaning or other desired purpose. The evaporating or heating tubes 7 are retained in place by means of connectors each consisting of a threaded stem 9 and spaced members 10, the latter being connected to the upper ends of the tubes 6 and the threaded stems 9 passing through openings in the upper ends of the tubes 7 and receiving nuts 11. Washers are interposed between the lower ends of the tubes 7 and the supporting sheet 8 to maintain a close joint. Other washers 12 are interposed between the nuts 11 and the upper ends of the tube 7 to insure a tight joint. The openings 13 of each tube sheet 8 are of such a size as to insure the formation of a space around the tube 6. The tubes 7 are supported in line with the openings 13 and are readily detachable by removal of the nuts 11 from the threaded stems of the connectors.

Each of the sections has observation openings 14 which are covered by glass or other transparent material. A gallery 15 surrounds each section and the several galleries are accessible by means of stair-ways 16. The sections consist of metal shells 17 and each has an outlet 18 for the water of condensation, an outlet 19 for the juice solution or other liquid to be concentrated and an inlet 20 through which the juice, solution, or liquid to be concentrated is admitted. The series of sections 1, 2 and 3 are capped by means of a section 21 which is used for condensation purposes only and not for effecting further concentration of the solution or liquid undergoing concentration. It has been observed that as a liquor or solution becomes more concentrated in its passage from one pan to another in a multiple evaporating apparatus the tendency for particles of liquor to be carried along with the vapor increases, particularly as the pressure to which the liquor is subjected decreases. This condition may be neglected in the earlier stages of concentration but in the last section of a multiple effect evaporator it is necessary to adopt some means for arresting the globules of concentrated liquor which are certain to be carried along with the escaping vapor. The present structure effectually prevents this loss of material. Not only is the area of vapor conduits ample, thereby permitting a low velocity for the escaping vapor, but the arrangement for partially condensing the same further decreases its velocity, thereby allowing the entrained liquor to precipitate onto the floor of the chamber provided for the purpose. The section 21 is similar in construction to any one of the sections 1, 2 and 3 and consists of an open tank into which the cold juice from the cane crusher is caused to flow, absorbing heat in its passage through the tank. From this tank the juice may be conveyed by suitable means to the desired destination. The same result may be obtained by the employment of cold water, but with consequent waste of heat. The vapor diminished in volume passes from the vapor space of the section 21 through a pipe 22 to the main condenser. With the necessary quantity of cold water passing into the tank of the section 21 it is quite feasible to complete the condensation of vapor in the apparatus, dispensing entirely with the use of a separate condenser. An outlet 23 is provided for carrying off the sweetened water which may be used for diluting in mills or molasses.

The present invention provides for a separate treatment of the water of condensation. The disposition of these waters in the standard and usual types of evaporators is a serious detriment to the heating surface of succeeding effects. In the present invention the water of condensation is turned off from each section separately and conveyed into an auxiliary evaporator where the combined waters pass through a similar arrangement of tubes as in the main evaporator. This auxiliary evaporator is indicated at 24 and is set upon the floor line. The water from the several sections is discharged into a pipe 25 and is delivered into the lower portion of the auxiliary evaporator 24 and flows upwardly through the tubes 26 thereof, which tubes correspond in construction and arrangement to the vapor tubes 6. The water escapes from the upper ends of the tubes 26 into the tubes 27 and flows downwardly into the space 28 formed between the two tube sheets, thence outwardly through a pipe 29 which leads to the pump. It is to be understood that the number, length, size and disposition of the several tubes in any one of the sections or evaporators may vary.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claim appended hereto.

Having thus described the invention what is claimed as new, is:—

A multiple effect evaporator comprising a plurality of superposed evaporator sections separated by spaced sheets between which are formed water condensing spaces, a pan arranged below the lowermost section, each of the sections having an inlet in its upper portion to receive the liquid to be concentrated and provided in its lower portion with an outlet for the discharge of the concentrated solution, vapor tubes open throughout their length and having their lower ends extending across the water condensing spaces and connected with the lowermost sheets, evaporating tubes closed at their upper ends and extending over the vapor tubes and supported at their lower ends in the uppermost sheets and in communication with the water condensing spaces, pipes leading from the water condensing spaces, a main pipe connecting the several pipes, an evaporator section capping the superposed sections and provided with vapor and evaporating tubes, a pipe leading from the water condensing space of the capping evaporator section, and an auxiliary evaporator having the before mentioned main pipe and the pipe leading from the capping evaporator section connected therewith.

In testimony whereof I affix my signature in presence of two witnesses.

ROBERT LOUGHER.

Witnesses:
CARHINDOZ WATERS,
R. T. FORREST.

Copies of this patent may be obtained for five cents each, by addressing the "Commissioner of Patents, Washington, D. C."